UNITED STATES PATENT OFFICE.

JOEL STARRELS, OF NIAGARA FALLS, NEW YORK.

CANDY-MAKING.

1,387,019.  Specification of Letters Patent.  Patented Aug. 9, 1921.

No Drawing.   Application filed October 30, 1919. Serial No. 334,585.

*To all whom it may concern:*

Be it known that I, JOEL STARRELS, a citizen of the United States, residing at Niagara Falls, in the county of Niagara and State of New York, have invented new and useful Improvements in Candy-Making, of which the following is a specification.

The present invention relates to candy making.

More particularly, the present invention relates to the manufacture of the varieties of candy of which chocolate forms an appreciable part. Difficulty has been encountered in the manufacture of candy containing chocolate, particularly in hot weather, due to the tendency of the chocolate to become soft and run. Various expedients have been resorted to for meeting this difficulty. Refrigeration is commonly used but when the candy is subsequently exposed to the ordinary temperatures encountered in the summer season, the chocolate softens and frequently becomes unsalable.

The present invention has for one of its objects the provision of a method of manufacturing chocolate candy whereby softening and melting during warm weather will be substantially overcome, whether said warm weather be encountered during the manufacturing stage or thereafter.

A further object is to provide a product for the manufacture of chocolate candy which will have the advantage that candy made therefrom will not soften or run at ordinary atmospheric temperatures.

Further objects will appear as the description preceeds.

In the manufacture of chocolate candy it is common to use cocoa butter as one of the constituents. Said cocoa butter has certain advantages which need not be recited herein and does not constitute an adulterant in chocolate or chocolate candy under the statutes of the United States. Cocoa butter in its ordinary form, as heretofore used does not prevent the softening and running above referred to.

According to one of the broad aspects of the present invention, cocoa butter which has been hardened, preferably by a process of hydrogenation, is provided to prevent the softening and running. This product, to-wit, the hardened or hydrogenated cocoa butter is used in a mixture with chocolate to provide a product with which the candy maker may proceed in the manufacture of chocolate candy.

According to one phase of the present invention, a simple mixture of chocolate and hydrogenated cocoa butter may be had. The amount of cocoa butter and the degree of saturation thereof will be chosen as desired to give the mixture the desired body and resistance to heat. This product will be used by the candy maker in exactly the same manner that chocolate has been commonly used in candy making, except that precautions, such as refrigeration, to prevent melting, will be unnecessary or the use thereof materially reduced.

If preferred, unhardened cocoa butter may be used as part of the mixture, the mixture, in that event, consisting of chocolate, unhardened cocoa butter and a reduced amount of the cocoa butter which has been hardened by a process of hydrogenation. Owing to the fact that a reduced amount of the hardened cocoa butter is used, said amount will be saturated to a relatively high degree, whereby the resulting mixture will have the desired degree of hardness and will successfully resist heat.

It will be obvious that the percentage of hydrogenated cocoa butter may be varied as desired whereby to vary the hardness and melting point of the product. The percentages of the various ingredients will be chosen to suit existing conditions.

Many modifications of the present invention will occur to those skilled in the art. It is intended in this patent to cover all such modifications that fall within the scope of the invention as defined by the appended claims.

What I claim as new and desire to secure by Letters Patent of the United States, is:—

1. A composition of matter including chocolate and hardened cocoa butter of which the amount of said cocoa butter and the degree of hardness thereof are such as to give the mixture a relatively high melting point with reference to chocolate.

2. A mixture of chocolate with cocoa butter of which cocoa butter an appreciable percentage has been hydrogenated.

In witness whereof I have hereunto subscribed my name.

JOEL STARRELS.